(12) United States Patent
Piercy et al.

(10) Patent No.: US 12,164,831 B2
(45) Date of Patent: Dec. 10, 2024

(54) PLAYLIST GENERATION BASED ON A DESIRED MENTAL STATE

(71) Applicant: Sonos, Inc., Santa Barbara, CA (US)

(72) Inventors: Phoebe K. Piercy, Cambridge, MA (US); Nicholas D'Amato, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/327,774

(22) Filed: Jun. 1, 2023

(65) Prior Publication Data
US 2023/0359428 A1 Nov. 9, 2023

Related U.S. Application Data

(63) Continuation of application No. 17/445,702, filed on Aug. 23, 2021, now Pat. No. 11,709,649, which is a continuation of application No. 16/921,027, filed on Jul. 6, 2020, now Pat. No. 11,137,975, which is a continuation of application No. 16/579,622, filed on Sep. 23, 2019, now Pat. No. 10,754,614.

(51) Int. Cl.
*G06F 3/16* (2006.01)
*G05B 15/02* (2006.01)

(52) U.S. Cl.
CPC ............ *G06F 3/165* (2013.01); *G05B 15/02* (2013.01)

(58) Field of Classification Search
CPC ................................ G06F 3/165; G05B 15/02
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Joseph Saunders, Jr.
(74) *Attorney, Agent, or Firm* — Fortem IP LLP

(57) ABSTRACT

In some embodiments, a method comprises receiving a first signal indicative of a current emotional state of a user, receiving a second signal corresponding to a desired emotional state of the user, and based on the first and second signals, generating a playlist of media content including a first item and an nth item. The first signal can be received from a wearable sensor. Generating the playlist can comprise selecting items of media content, and arranging the media content in a sequential order such that the playlist transitions from the first item toward the nth item. The method can further comprise playing back, via a playback device, at least the first item of the media content, and while playing back the first item, receiving a third signal indicative of an updated emotional state of the user.

20 Claims, 14 Drawing Sheets

(56) References Cited

U.S. PATENT DOCUMENTS

| | | |
|---|---|---|
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 8,977,374 B1 | 3/2015 | Eck et al. |
| 10,943,604 B1 | 3/2021 | Bone et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2005/0083883 A1 | 4/2005 | Ho et al. |
| 2006/0143647 A1 | 6/2006 | Bill |
| 2007/0142944 A1 | 6/2007 | Goldberg et al. |
| 2008/0320108 A1 | 12/2008 | Murty et al. |
| 2009/0296567 A1 | 12/2009 | Yasrebi et al. |
| 2011/0030032 A1 | 2/2011 | Baykal et al. |
| 2013/0166737 A1 | 6/2013 | Christenson et al. |
| 2014/0052731 A1 | 2/2014 | Dahule et al. |
| 2014/0164998 A1 | 6/2014 | Jadhav et al. |
| 2015/0127818 A1 | 5/2015 | Bates et al. |
| 2015/0206523 A1 | 7/2015 | Song et al. |
| 2015/0297109 A1 | 10/2015 | Garten et al. |
| 2019/0000384 A1 | 1/2019 | Gupta et al. |
| 2019/0042180 A1 | 2/2019 | Vartakavi et al. |
| 2020/0075039 A1 | 3/2020 | Eleftheriou et al. |
| 2020/0286505 A1 | 9/2020 | Osborne et al. |

OTHER PUBLICATIONS

AudioTron Reference Manual, Version 3.0, May 2002, 70 pages.
AudioTron Setup Guide, Version 3.0, May 2002, 38 pages.
Bankar et al. Driving Control Using Emotion Analysis Via EEG. 2018 IEEE PUNECON, Nov. 30, 2018, 7 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action mailed on Sep. 20, 2022, issued in connection with U.S. Appl. No. 17/445,702, filed Aug. 23, 2021, 12 pages.
First Action Interview Office Action mailed on Jan. 13, 2020, issued in connection with U.S. Appl. No. 16/579,622, filed Sep. 23, 2019, 4 pages.
Garcias de Assuncao et al. An Algorithm for Music Recommendation Based on the User's Musical Preferences and Desired Emotions. Mobile and Ubiquitous Multimedia, Nov. 25, 2018, 9 pages.
International Bureau, International Preliminary Report on Patentability, mailed on Apr. 7, 2022, issued in connection with International Application No. PCT/US2020/070567, filed on Sep. 23, 2020, 10 pages.
International Searching Authority, International Search Report and Written Opinion mailed on Feb. 3, 2021, issued in connection with International Application No. PCT/US2020/070567, filed on Sep. 23, 2020, 12 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Jun. 27, 2022, issued in connection with U.S. Appl. No. 17/445,702, filed Aug. 23, 2021, 15 pages.
Non-Final Office Action mailed on Sep. 8, 2020, issued in connection with U.S. Appl. No. 16/921,027, filed Jul. 6, 2020, 12 pages.
Notice of Allowance mailed on May 20, 2021, issued in connection with U.S. Appl. No. 16/921,027, filed Jul. 6, 2020, 11 pages.
Notice of Allowance mailed on Apr. 22, 2020, issued in connection with U.S. Appl. No. 16/579,622, filed Sep. 23, 2019, 11 pages.
Notice of Allowance mailed on Mar. 3, 2023, issued in connection with U.S. Appl. No. 17/445,702, filed Aug. 23, 2021, 6 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

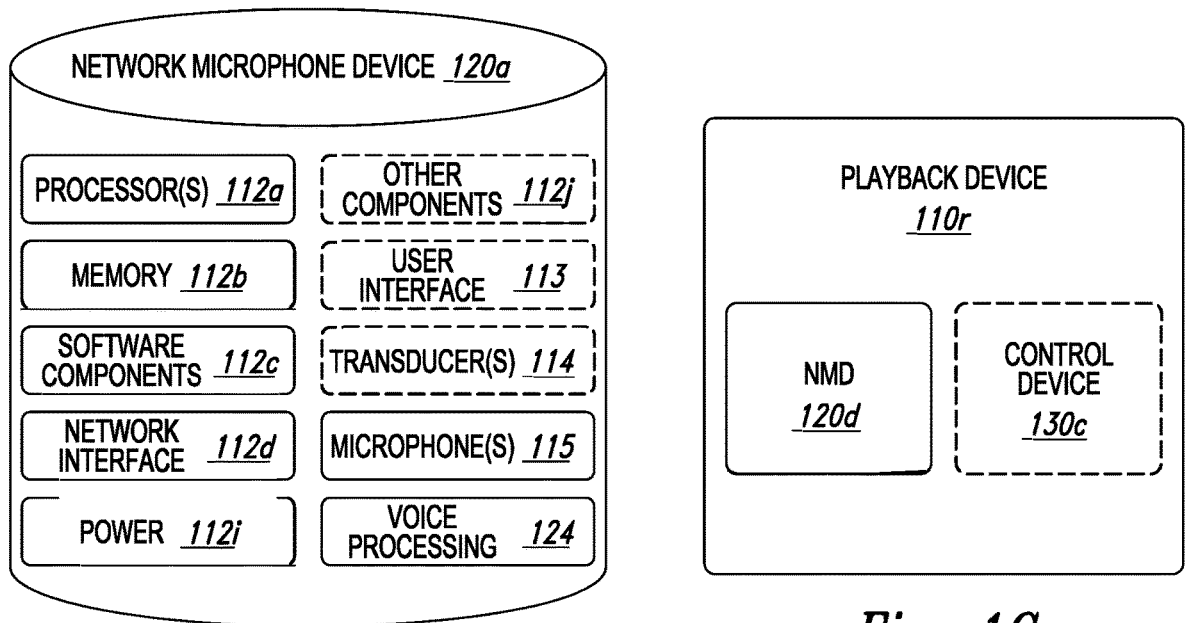
*Fig. 1F*
*Fig. 1G*
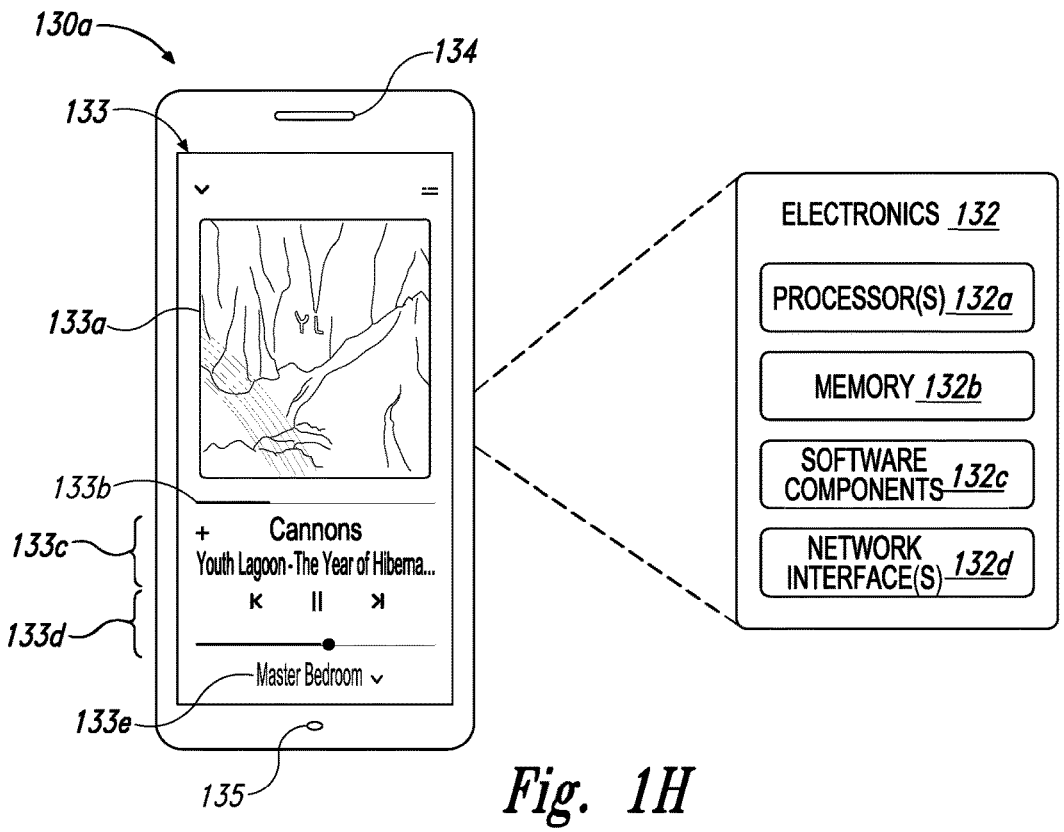
*Fig. 1H*

PLAYLIST GENERATION BASED ON A DESIRED MENTAL STATE

CROSS-REFERENCE TO RELATED APPLICATION

The present application is a continuation of U.S. patent application Ser. No. 17/445,702, filed Aug. 23, 2021, now U.S. Pat. No. 11,709,649, which is a continuation of U.S. patent application Ser. No. 16/921,027, filed Jul. 6, 2020, now U.S. Pat. No. 11,137,975, which is a continuation of U.S. patent application Ser. No. 16/579,622 filed Sep. 23, 2019, now U.S. Pat. No. 10,754,614, the disclosures of which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

Figure 1A:
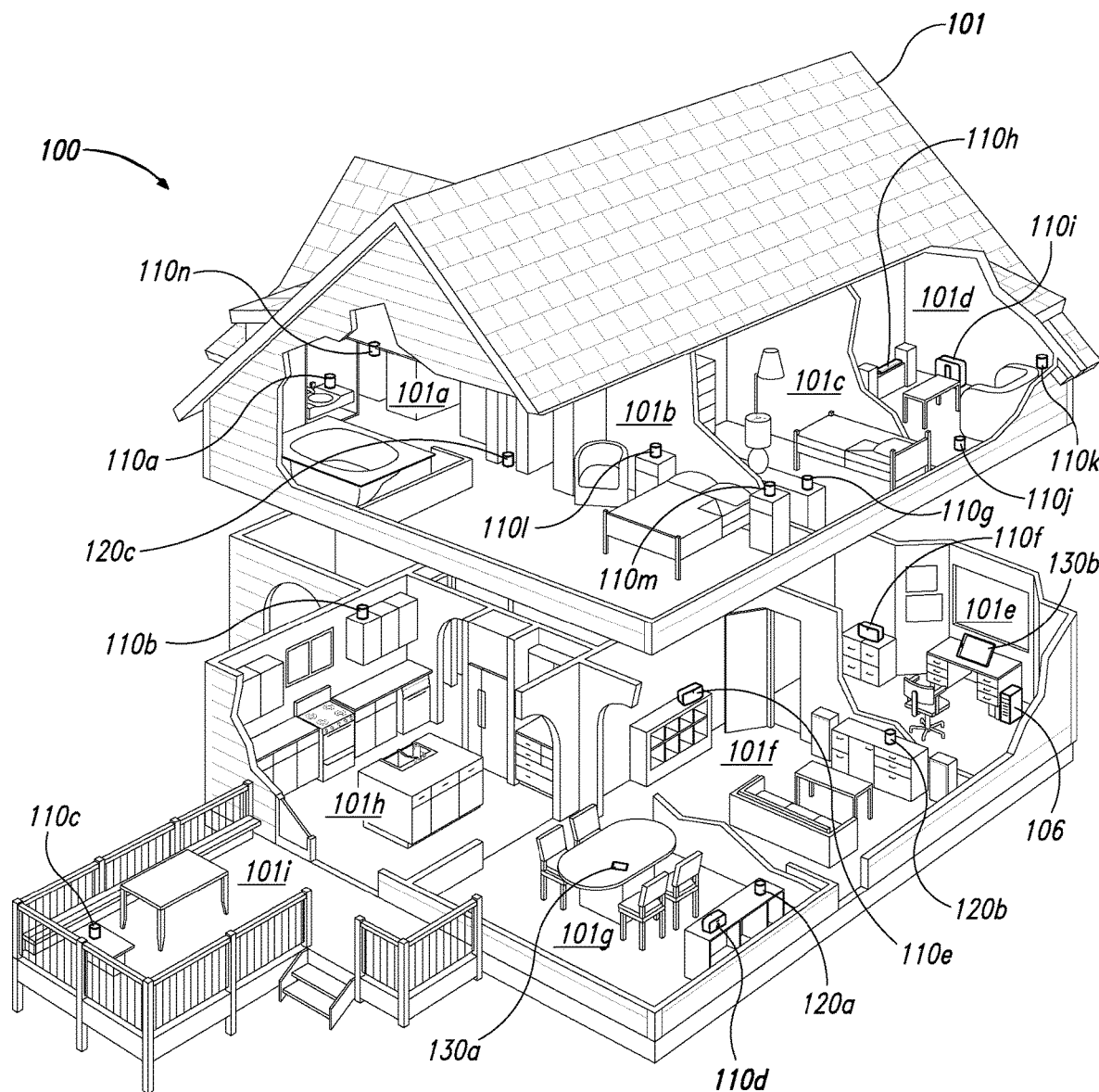
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Music and other media content can significantly affect a user's emotional state. Various attempts have been made to curate playlists of media content that are intended to direct a user's mood or other mental states (e.g., a mood-lifting playlist intended to raise a user's spirits, a study playlist intended to increase a user's concentration, etc.). However, the effects of a particular song or other media content may depend greatly on a user's present emotional state. For example, a user in a current state of severe depression user may be unmoved or even annoyed at hearing a cheerful, upbeat pop song. Accordingly, it can be useful to select songs or other media items that affect a user's mood incrementally or gradually, with each subsequent song intended to shift the user's mood closer towards a desired emotional state.

Additionally, current devices for influencing a user's emotional state via audio playback do not consider changes in the user's current emotional state during the playback. As such, current devices are unable to determine in real time the effect the audio playback is having on the user, and thus whether the playback is having the intended effect on the user's emotional state. Moreover, different users may respond differently to the same media content. For example, one user's mood may improve markedly upon listening to "Wake Up" by Arcade Fire, while another user's mood may darken in response to the same song. As a result, it can be useful to monitor a user's emotional state in real time during playback of media content intended to induce a desired emotional state in a user. Depending on the detected shifts in the user's emotional state, the playlist may be updated dynamically to achieve the desired gradual shifts in the user's mood.

Embodiments of the present technology address at least some of the above described issues, and generally relate to improved systems and methods for generating a playlist of media content to be played via a playback device. The generated playlist is based at least in part on a user's current emotional state and/or desired emotional state. The generated playlist can be configured to influence and/or gradually transition the emotional state of the user from the current emotional state to the desired emotional state.

Some embodiments of the present technology relate to receiving a first signal indicative of a current emotional state of a user, receiving a second signal corresponding to a desired emotional state of the user, and, based at least in part of the first and second signals, generating a playlist of media content. The first signal can be received from a sensor (e.g., a wearable brain sensing band) worn by the user. In some embodiments, generating the playlist comprises selecting items of media content including at least (i) a first item of media content having a first parameter corresponding to the current emotional state of the user, (ii) a second item of media content having a second parameter different than the first parameter, and (iii) an nth item of media content having an nth parameter corresponding to the desired emotional state of the user. The generated playlist is arranged in a sequential order such that the playlist transitions from the first item toward the nth item. The playlist can then be played back via a playback device. During playback, the user's current emotional state may be received, e.g., to determine whether the playlist is having an intended effect on the user and/or if the user's emotional state is gradually transitioning toward the desired emotional state. If the user's emotional state is gradually transitioning away from the desired emotional state or in an unexpected manner, the playlist may be updated.

As explained in more detail below, generating the playlist in such a manner, and playing back the playlist to the user, provides an improved ability to influence the emotional state of the user, e.g., from the current emotional state toward the desired emotional state. Unlike current devices or methods for influencing a user's emotional state, embodiments of the present technology consider the current and desired emotional states of the user, and play media content of the generated playlist to gradually influence the user's emotional state along a pathway that includes the current and desired emotional states. In doing so, the user's current emotional state is continuously and/or iteratively considered such that the playlist can be continuously updated during playback as necessary to ensure the user's emotional state gradually transitions toward the desired emotional state.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs") 120 (identified individually as NMDs 120a-c), and one or more control devices 130 (identified individually as control devices 130a and 130b).

As used herein the term "playback device" can generally refer to a network device configured to receive, process, and/or output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers or one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 110a) in synchrony with a second playback device (e.g., the playback device 110b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments.

In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
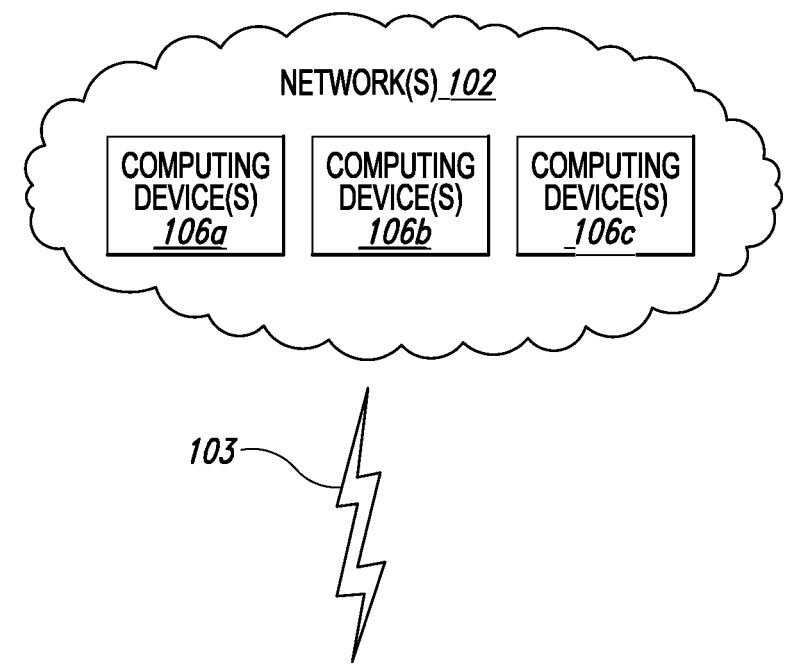
FIG. 1B is a schematic diagram of the media playback system of FIG. 1A and one or more networks.
Figure 1B:
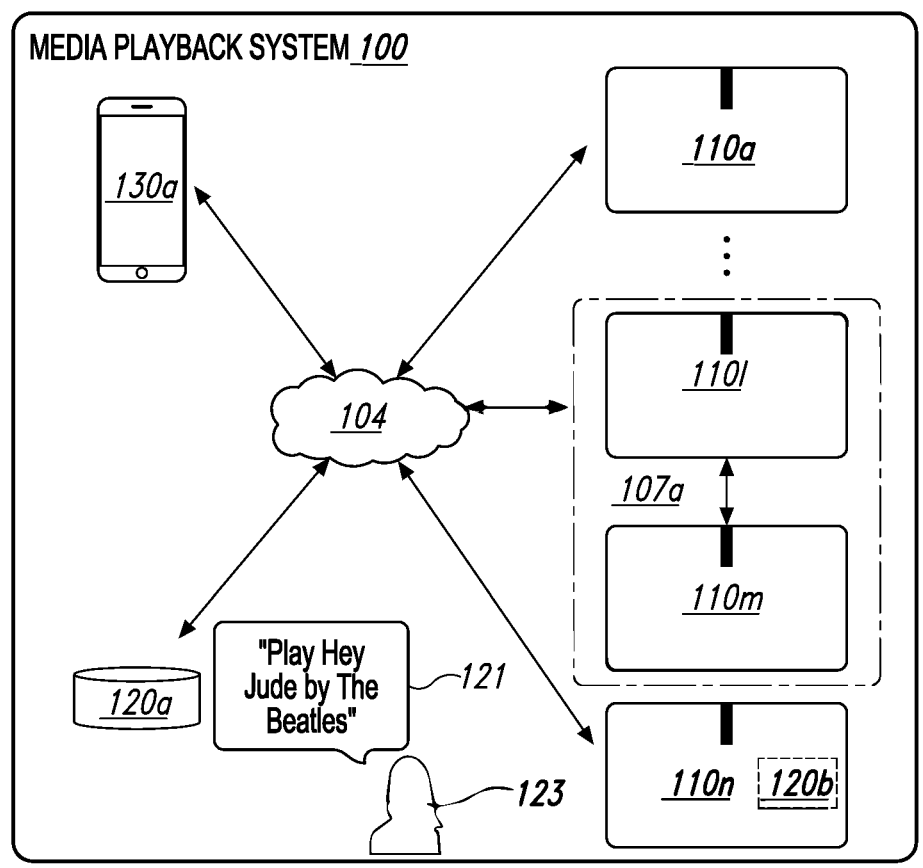

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, NMDs 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
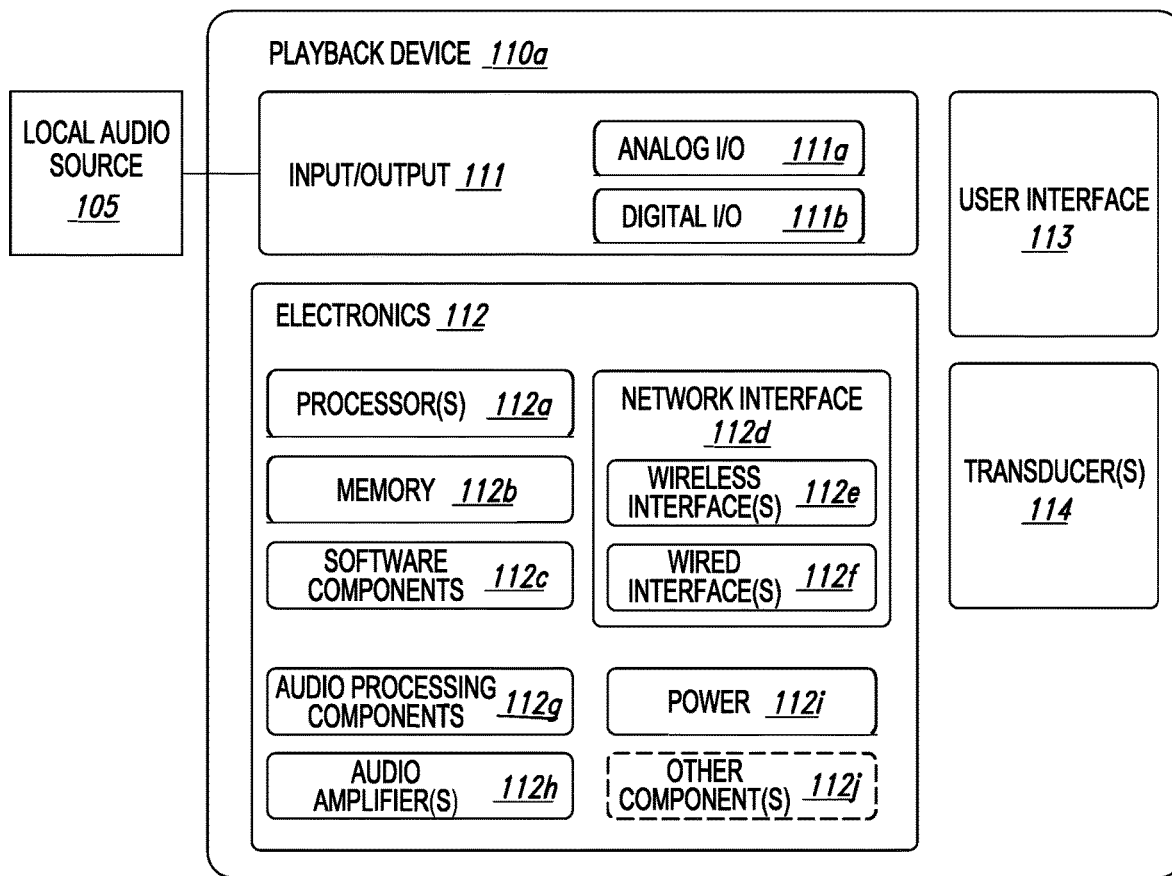
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises a High-Definition Multimedia Interface (HDMI) interface and/or cable. In some embodiments, the digital I/O 111*b* includes one or more wireless communication links comprising, for example, a radio frequency (RF), infrared, WiFi, Bluetooth, or another suitable communication protocol. In certain embodiments, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a*-*c* via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
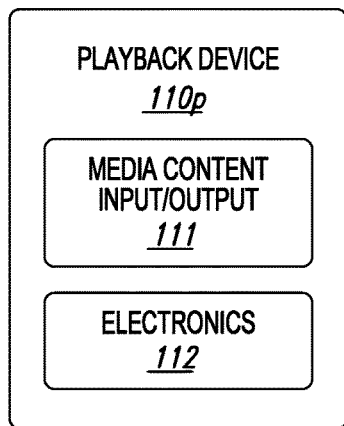
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
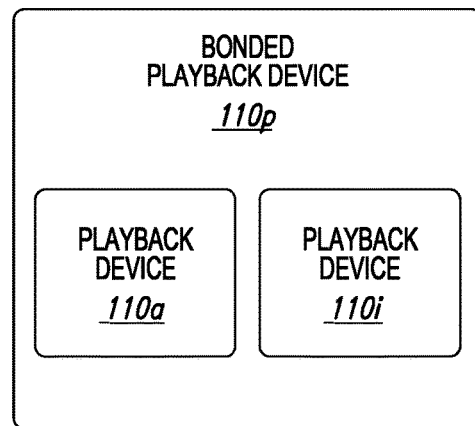
FIG. 1E is a block diagram of a bonded playback device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 112a to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 130 to one or more of the playback devices 110. The network interface 132d can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Systems and Methods for Detecting and/or Influencing Mood Via a Playback Device A playback device can be configured to generate a playlist of media content based at least in part on (i) a received first signal indicative of a user's current emotional state and (ii) a received second signal indicative of a user's desired emotional state. The generated playlist can be played back via a playback device, as previously described, to influence the user's emotional state from the current emotional state toward and/or to the desired emotional state. As explained in detail elsewhere herein, the user's emotional state can be constantly or periodically monitored and considered by the system as media content is played for the user. In doing so, the system can determine whether the playlist is having an intended effect on the user and/or whether the playlist needs to be updated. Although several embodiments of the present technology relate to methods for generating such a playlist via a playback device, in some embodiments a control device (e.g., the control device 130; FIG. 1B), a remote computing device (e.g., the remote computing device 106; FIG. 1B), or any other components of a media playback system can generate such a playlist. Additionally, in some embodiments the generated playlist may be played back via the playback device that generated the playlist or via any other playback device(s).

Figure 2:
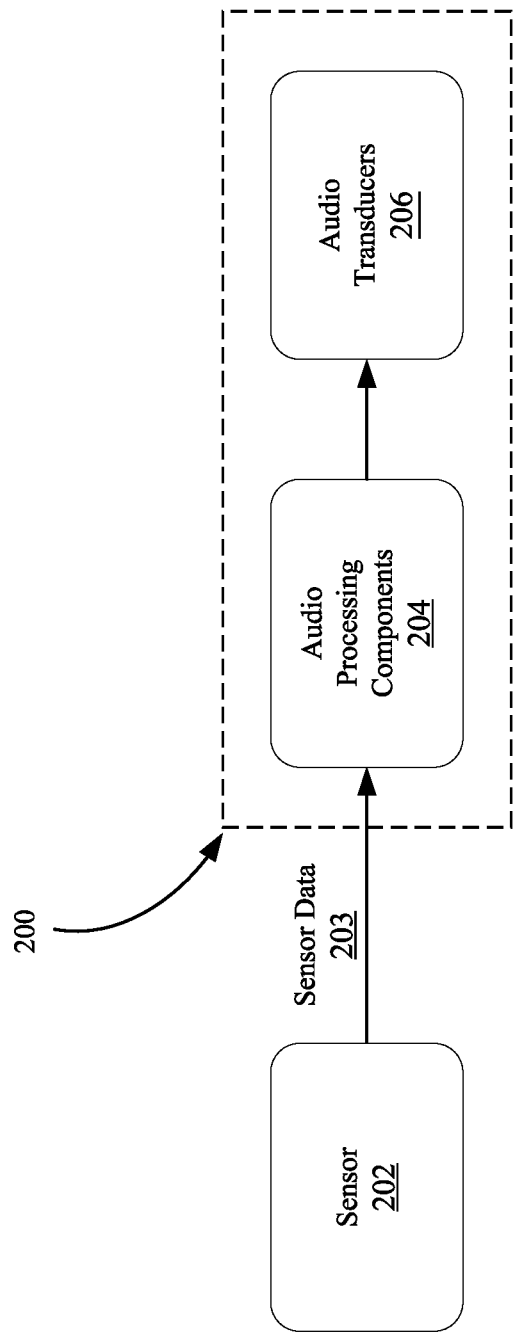
FIG. 2 is a schematic block diagram of a system for receiving sensor data from a sensor, in accordance with embodiments of the disclosed technology.

FIG. 2 is a schematic block diagram of a system 200 for receiving sensor data 203 from a sensor 202, in accordance with embodiments of the disclosed technology. In some embodiments, the system 200 can form a part of the electronics 112 of the playback device 110a, as previously described with reference to FIG. 1C. As shown in FIG. 2, the sensor data 203 is produced via the sensor 202 is received by one or more processing components 204 of the system 200. The sensor data 203 can be wirelessly provided to the processing components 204 via any of the wireless networks previously described (e.g., WiFi, Bluetooth, Z-Wave, ZigBee, and/or other suitable wireless communication protocol networks). Processed data from the processing components 204 can then be provided to audio transducers 206 of the playback device 110a, e.g., for audio playback. For example, as explained in more detail elsewhere herein, the processing components 204 can generate a playlist of media content based at least in part on the sensor data 203, and the generated playlist can be provided to the audio transducers 206 for audio playback.

Figure 3:
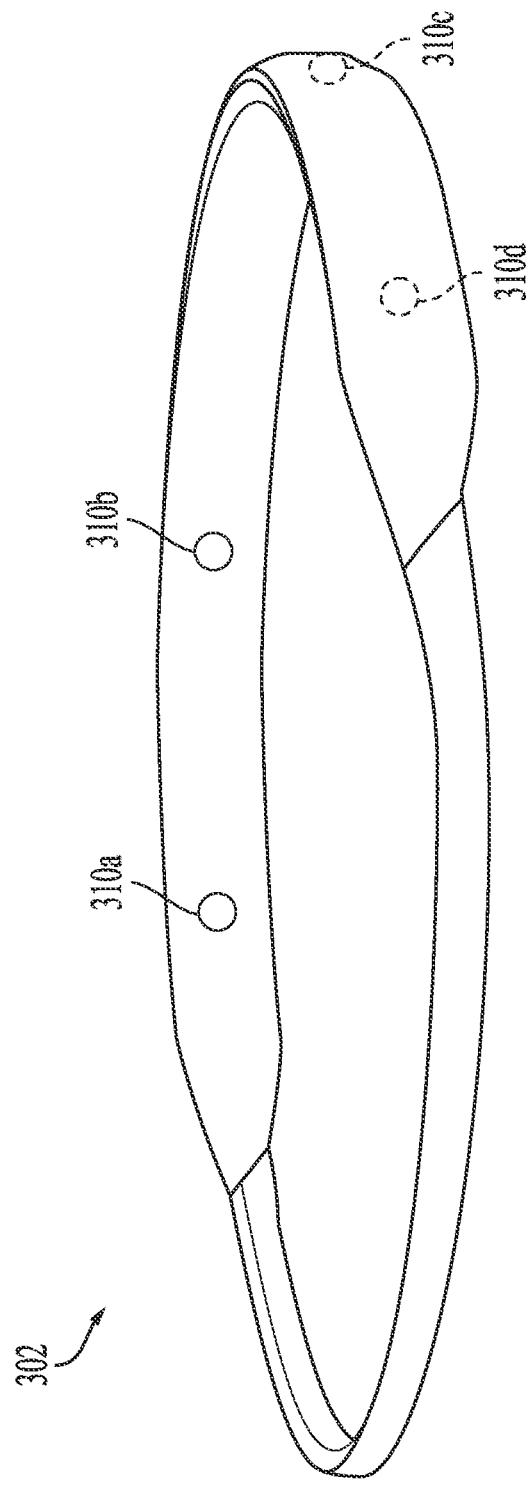
FIG. 3 is a partially schematic illustration of a wearable brain sensing headband, in accordance with embodiments of the present technology.

The sensor 202 is configured to generate information generally corresponding to a user's mood or emotional state. FIG. 3 is a partially schematic illustration of a wearable brain sensing headband 302, which is one of many examples of the sensor 202 described with reference to FIG. 2. As shown in FIG. 3, the headband 302 (e.g., an electroencephalography (EEG) headband) includes sensors 310a-d, each of which are configured to receive data from the user that corresponds to the sensor data 203 referred to in FIG. 2. Although four sensors are illustrated in FIG. 3, some embodiments may include fewer (e.g., one, two or three) or more (e.g., five, six, seven) sensors. In some embodiments, the headband 302 can correspond to any of the Muse™ headbands (InteraXon; Toronto, Canada). As shown in FIG. 3, the sensors 310a-d can be positioned at varying locations around an inner surface of the headband 302, e.g., to correspond to different brain anatomy (e.g., the frontal, parietal, temporal, and sphenoid bones) of the user. As such, each of the sensors 310a-d can receive different data from the user. Each of the sensors 310a-d can correspond to individual channels that can be streamed from the headband 302 to the system 200 (FIG. 2). Alternatively, individual sensors 310a-d can be combined with other individual sensors 310a-d to form one or more channels. For example, sensors 310a, 310b can be combined to form a first channel (e.g., a "left channel") and sensors 310c, 310d can be combined to form a second channel (e.g., a "right channel"). In such embodiments, the sensor data 203 can include data from one or more distinct channels.

Referring back to FIG. 2, the processing components 204 receive and process the sensor data 203 such that one or more parameters (referred to herein as a "parameter") is produced from the sensor data 203. As described in more detail elsewhere herein, the system can use the parameter to determine an emotional state of the user. In some embodiments, processing the sensor data 203 can include performing fast Fourier transform (FFT) operations on at least a portion of the sensor data 203 (e.g., on each channel stream of the sensor data 203), e.g., to calculate a power density of individual signals or an aggregate signal of the sensor data 203. Additionally or alternatively, processing the sensor data 203 can include splitting the calculated power density into multiple frequency bands. For example, in some embodiments the power density associated with the sensor data 203 may be split into five frequency bands including: (i) a gamma band corresponding to 32-100 hertz (Hz) signals, (ii) a beta band corresponding to 13-32 Hz signals, (iii) an alpha band corresponding to 8-13 Hz signals, (iv) a delta band corresponding to 4-8 Hz signals, and (v) a theta band corresponding to less than 4 Hz signals. In some embodiments, the system can then determine the relative power of each frequency band and/or the relative power of individual bands between different channels. As explained elsewhere herein, the system may then use data associated with the relative power to determine an emotional state of the user.

Figure 4:
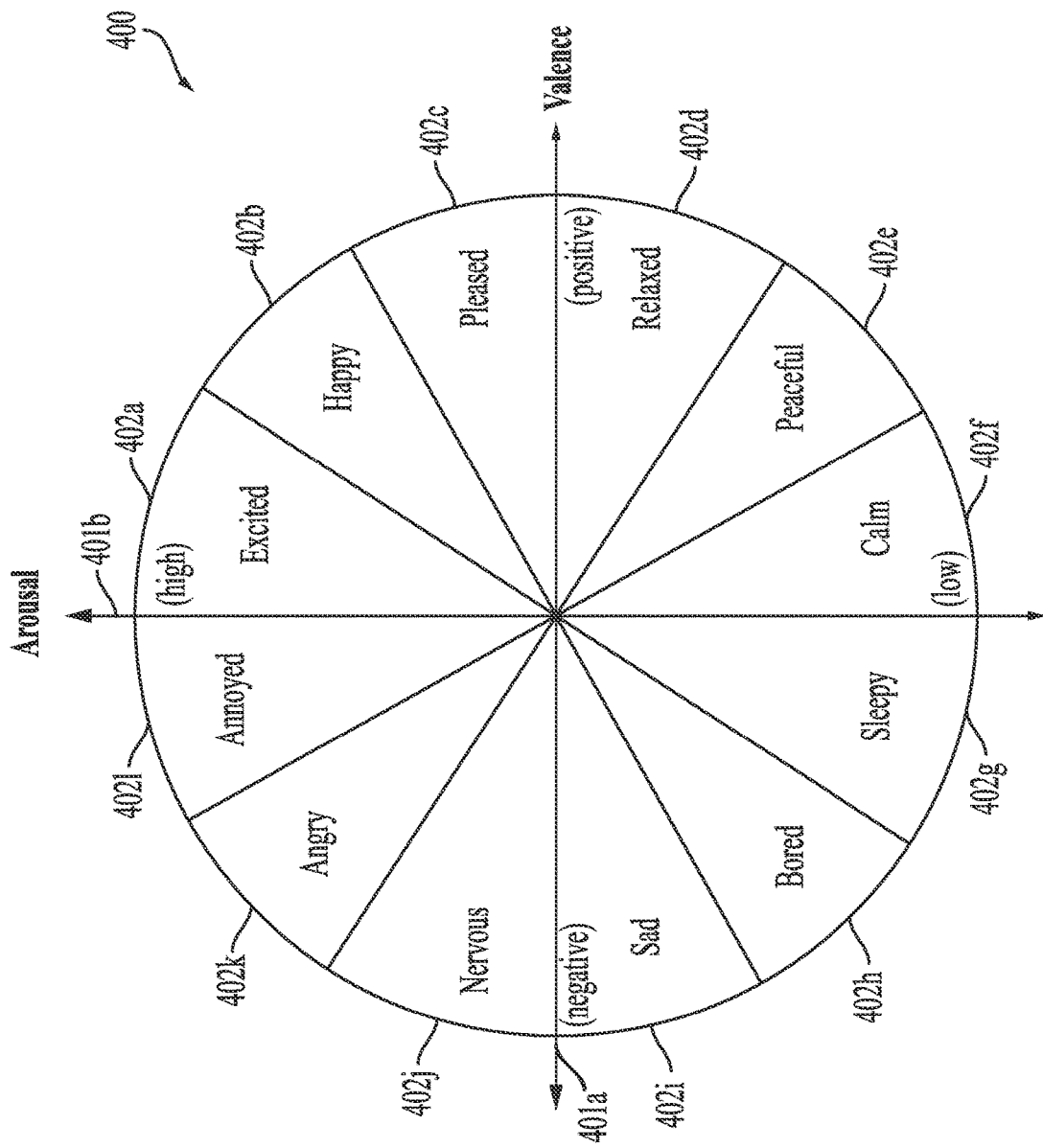
FIG. 4 is an illustration of an emotion classification plane, in accordance with embodiments of the present technology.

FIG. 4 is an illustration of an emotion classification plane 400, in accordance with embodiments of the present technology. As shown in FIG. 4, the plane 400 can generally correspond to a Valence-Arousal (VA) plane, with the horizontal axis 401a corresponding to negative and positive values for valence, and the vertical axis 401b corresponding to the high and low values for arousal. The plane 400 includes multiple sections 402a-1 each corresponding to a distinct emotion. That is, section 402a corresponds to "excited," section 402b corresponds to "happy," section 402c corresponds to "pleased," section 402d corresponds to "relaxed," section 402e corresponds to "peaceful," section 402f corresponds to "calm," section 402g corresponds to "sleepy," section 402h corresponds to "bored," section 402i corresponds to "sad," section 402j corresponds to "nervous," section 402k corresponds to "angry," and section 402l corresponds to "annoyed." While the plane 400 includes 12 sections, in some embodiments the plane 400 can include fewer (e.g., four, five, etc.) or more (e.g., fifteen, twenty, etc.) sections. Additionally or alternatively, in other embodiments the plane 400 can correspond to an emotion classification plane different than the VA plane.

As described elsewhere herein, embodiments of the present technology are configured to process sensor data 203 (FIG. 2) received from a user and produce a parameter therefrom. In some embodiments, the produced parameter can correspond to a brain wave power density or other calculated value based at least in part on the sensor data 203. Additionally or alternatively, the produced parameter can correspond to a point or coordinate on the plane 400 such that the parameter is associated with one of the sections 402a-l and the associated emotion. As such, the plane 400, or more particularly the horizontal and vertical axes 401a, 401b of the plane 400, can correspond to processed data (e.g., relative power of frequency bands, relative power of individual bands of channels, etc.) determined by the system 200 (e.g., by the processing components 204), as described with reference to FIG. 2. In some embodiments, the horizontal and/or vertical axes 401a, 401b of the plane correspond to a range of values associated with ratios of data corresponding to individual channels, frequency bands, and/or relative powers.

For example, in some embodiments the horizontal axis 401a of the plane 400 corresponds to a range of values associated with a ratio of the "left channel" signals and "right channel" signals, with a higher ratio corresponding to a more positive value on the horizontal axis 401a and a low ratio corresponding to a more negative value on the horizontal axis 401a. The left channel can be indicative of brain activity levels in the user's left hemisphere or a portion thereof, and the right channel can be indicative of brain activity levels in the use's right hemisphere or a portion thereof. Because positive emotional states are associated with relatively higher activity levels in the right hemisphere (and conversely negative emotional states are associated with relatively higher activity levels in the left hemisphere), the ratio of these channels can be used to calculate an associated valence value along the horizontal axis 401a of the plane 400. Although the illustrated example utilizes left and right channels to calculate a valence score, in other embodiments different techniques can be used to assign values indicative of the valence of a user's emotional state. For example, the valence can be calculated by comparing certain frequency bands, by evaluating brain activity in different anatomical regions beyond left and right hemisphere, or any other suitable technique.

Additionally or alternatively, in some embodiments the vertical axis 401b of the plane 400 corresponds to a range of values associated with a ratio of (i) the relative power of the beta band signals, (ii) the relative power of the theta band signals, and (iii) the relative power of the alpha band signals. A higher ratio of these signals may correspond to a higher value on the vertical axis 401b. Because high levels of theta and alpha band signals are associated with low-arousal states (e.g. deep relaxation or sleepiness) and high levels of beta band signals are associated with high-arousal states (e.g., focused and alert), the ratio of these signals can be used to calculate an associated arousal value along the vertical axis 401b of the plane 400. Although the illustrated example utilizes beta, theta, and/or alpha signals to calculate an arousal score, in other embodiments different techniques can be used to assign values indicative of the arousal of a user's emotional state. For example, the arousal can be calculated by evaluating brain activity in one or more anatomical regions, by comparing certain frequency bands other than beta, theta, or alpha, or by using any other suitable technique.

Figure 5:
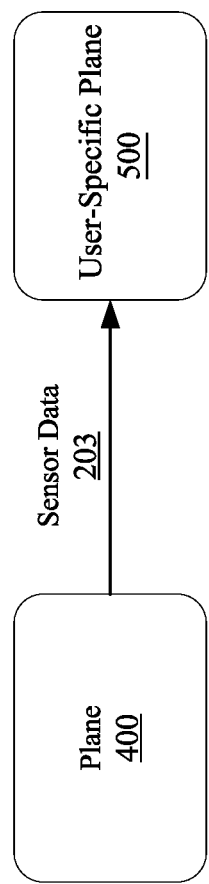
FIG. 5 is a schematic block diagram for generating a user-specific emotional classification plane, in accordance with embodiments of the present technology

In some embodiments, the plane 400 is tailored to correspond to a particular user. Because the sensor data associated with a given emotional state may be slightly different for each user, adjusting the plane 400 (e.g., the origin of the plane 400) for each user can beneficially improve the accuracy of determining a user's current emotional state and/or the pathway needed to obtain a desired emotional state. Stated differently, a state of calm for a first user may correspond to a first parameter value, whereas a state of calm for a second user may correspond to a second parameter value different than the first parameter value. FIG. 5 is a schematic block diagram for generating a user-specific emotion classification plane 500. As shown in FIG. 5, the plane 400 is adjusted to form the user-specific plane 500 based on the sensor data 203 previously described (e.g., with reference to FIG. 2). In some embodiments, the sensor data 203 used to generate the user-specific plane 500 can correspond to calibration data obtained from the user, e.g., by exposing the user to a calibration test or particular set of conditions. For example, predetermined media content items (e.g., audio content, songs, podcasts, generative music, video sounds, videos, etc.) considered to be "neutral" input or that expected to place the user in a "neutral state" can be played back to the user, and sensor data 203 can be obtained therefrom. The "neutral state" for that particular user can be determined based on the obtained sensor data 203, and the user-specific plane 500 can be generated therefrom. In some embodiments, the sensor data 203 corresponding to the user's "neutral state" is only obtained once, e.g., during an initial use, and is saved and applied automatically for future uses.

Figure 6:
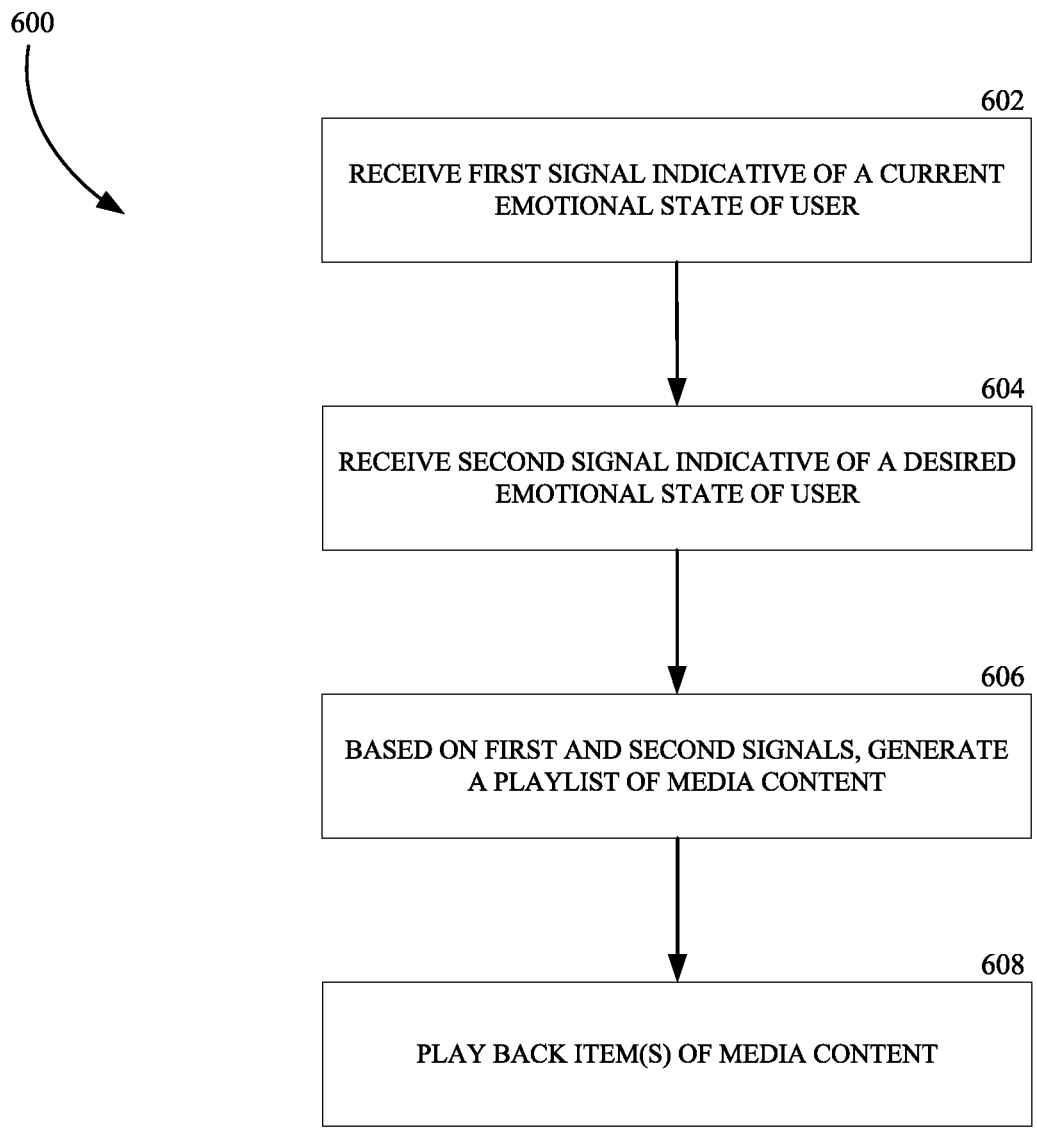
FIGS. 6-8 are flow diagrams of methods for generating a playlist of media content based at least in part on an emotional state of a user, in accordance with embodiments of the present technology.
Figure 7:
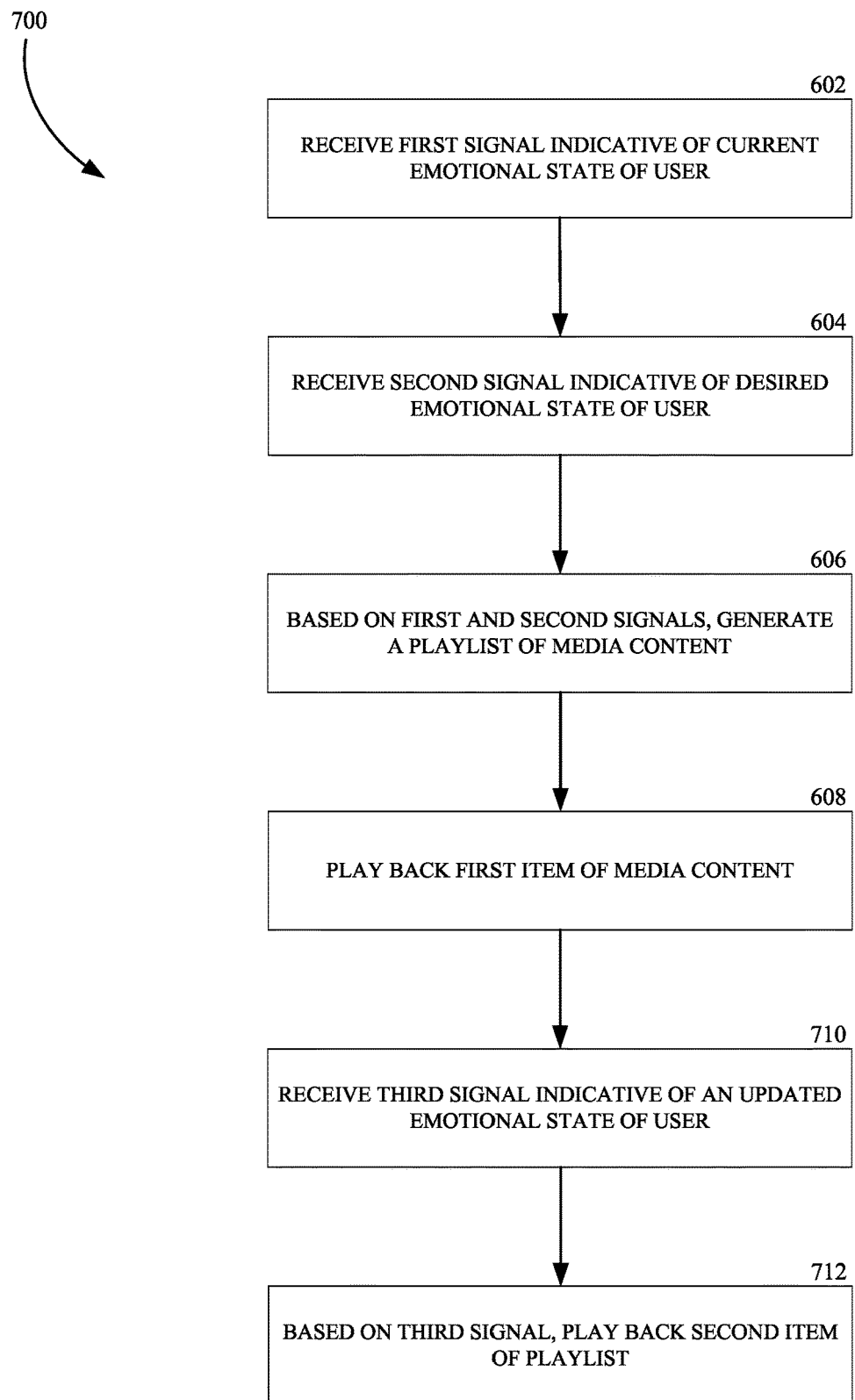
Figure 8:
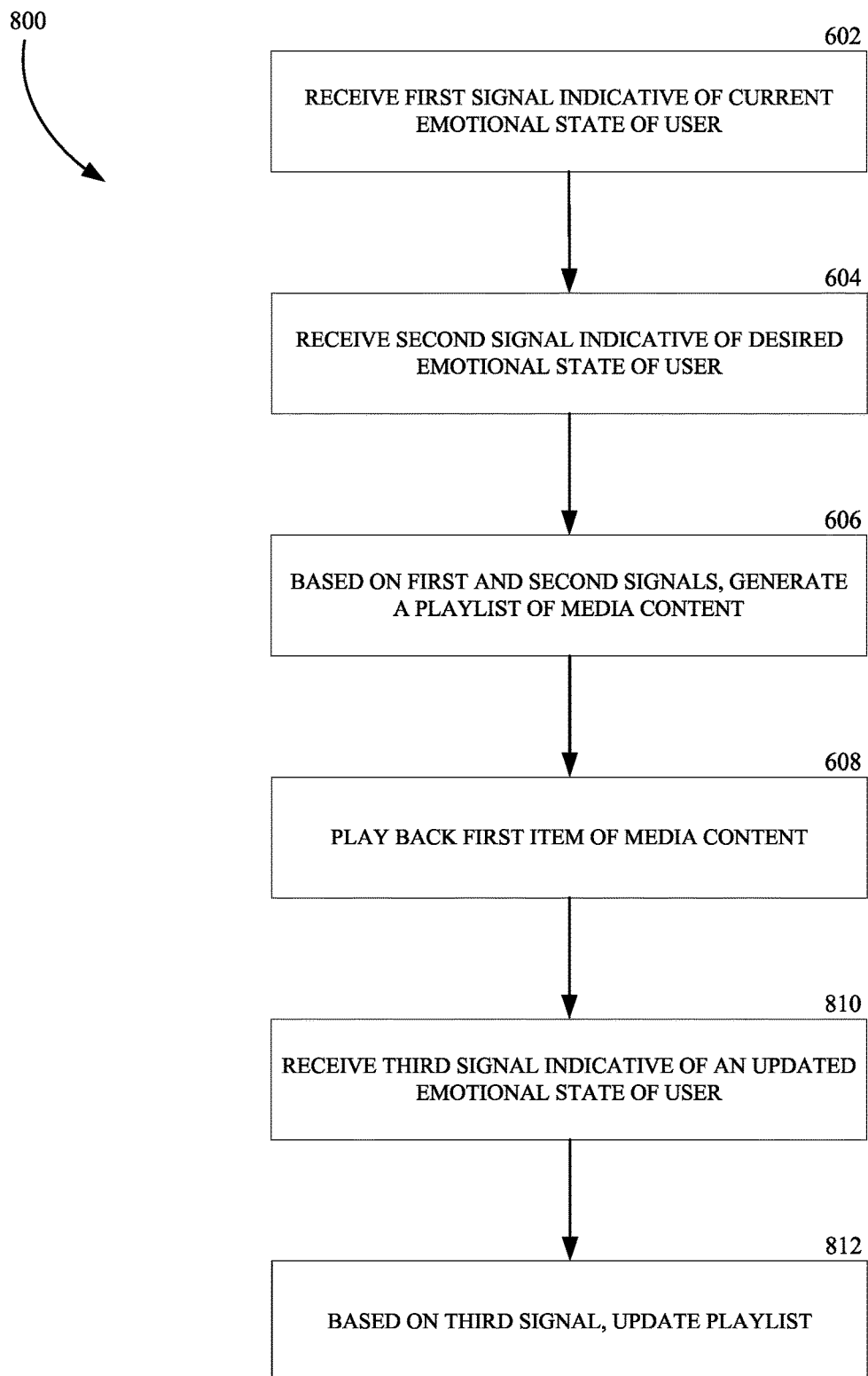

FIGS. 6-8 illustrate various methods for generating playlists of media content. In some embodiments, the processes described below include one or more instructions stored in memory (e.g., the memory 112b; FIG. 1) and executed by one or more processors (e.g., the process 112a; FIG. 1) of a playback device (e.g., the playback device 110; FIG. 1). Additionally or alternatively, the instructions may be executed by one or more processors associated with other devices (e.g., remote computing devices 106, a network microphone device 120, a control device 130, etc.; FIG. 1).

FIG. 6 is a flow diagram of a method 600 for generating a playlist of media content based at least in part on an emotional state of a user, in accordance with embodiments of the present technology. The method 600 includes receiving a first signal indicative of a current emotional state of a user (process portion 602). The first signal can include sensor data (e.g., the sensor data 203; FIG. 2) received from a wearable sensor (e.g., the sensor 202; FIG. 2) or a non-wearable sensor and can correspond to brainwave data of the user. The first signal can be received by a playback device (e.g., the playback device 110a; FIG. 1C) and processed by the playback device's processing components (e.g., the processing components 204; FIG. 2) to produce a parameter, as described elsewhere herein (e.g., with reference to FIG. 2). In some embodiments, the parameter can correspond to a measurement or calculated value associated with the corresponding signal received from the user. In some embodiments, the parameter can correspond to a coordinate (i.e., a first coordinate) on a plane (e.g., the plane 400 or 500; FIGS. 4 and 5) that links the parameter to a particular emotion or emotional state. In such embodiments, the coordinate can include a valence value and an arousal value.

The method 600 further includes receiving a second signal indicative of a desired emotional state of the user (process portion 604). In some embodiments, the second signal is received from a control device (e.g., the control device 130; FIG. 1F) and corresponds to a user input. For example, a user may input or select from a list his or her desired emotional state (e.g., happy, pleased, relaxed, peaceful, calm, etc.). In some embodiments, the desired emotional state can be automatically determined by the system, for example, based on the current emotional state of the user and/or a history of use associated with the user. The second signal indicative of the desired emotional state can correspond to a parameter similar to that previously described. For example, the parameter corresponding to the desired emotional state can have a particular coordinate (i.e., a second coordinate) that is different than the first coordinate associated with the first signal.

The method 600 further includes, based at least in part on the first and second signals, generating a playlist of media content (process portion 606). The playlist can include items (e.g., audio content, songs, podcasts, video sounds, videos, etc.) that, when played back to the user, are configured to influence the user's emotional state and gradually transition the user from the current emotional state toward and/or to the desired emotional state. Stated differently, the items of the playlist are configured to transition the user from the current emotional state, to one or more intermediate emotional states, and then to the desired emotional state.

As explained in detail elsewhere herein (e.g., with reference to FIGS. 9A-9C), generating the playlist can include selecting the items of the playlist. The items can include a first item having a first parameter, e.g., corresponding to the current emotional state of the user, and an nth item having an nth parameter, e.g., corresponding to the desired emotional state of the user. As used herein, a parameter can be considered to correspond to an emotional state (e.g., a current emotional state or desired emotional state) of the user when the item of media content has a value that links the item to a particular emotion. Additionally or alternatively, a parameter can be considered to correspond to an emotional state when the item tends to (e.g., based on historical data) produce an emotional state in a user that can be mapped to or near that point on an emotion characterization plane (e.g., the planes 400, 500; FIGS. 4 and 5). In some embodiments the first and nth parameters may correspond to respective first and nth coordinates on a plane (e.g., the planes 400 or 500; FIGS. 4 and 5), which can define a pathway therebetween. In addition to the first and nth items, the generated playlist can include one or more intermediate items (e.g., a second item, third item, etc.) each having respective parameters and/or coordinates positioned on the pathway between the first and nth coordinates. Generating the playlist can further include arranging the items of the media content in a sequential order such that the playlist transitions from the first item, to the intermediate items, and then to the nth item. Because the playlists' items can each include a parameter (e.g., a coordinate or position on the emotion characterization plane 400 or 500) corresponding to an emotion, playing back the generated playlist in the arranged order can at least partially influence the user's emotional state to transition from the current emotional state toward or eventually to the desired emotional state.

Each of the playlist's items can be selected to be part of the playlist based on an association with a particular emotion or set of emotions. For example, the items may be selected from a database of media content items, and may include metadata linking a particular item to a particular emotion. Additionally or alternatively, each of the playlist's items can be selected based on factors associated with the user, such as the user's musical interest and/or demographic (e.g., age, gender, personality type, nationality, etc.). In some embodiments, the user's musical interest can be determined based on the user's profile on a media content mobile application (e.g., Spotify®, YouTube®, YouTube Music®, Apple Music®, Amazon Music®, etc.). Additionally or alternatively to the above-mentioned factors, the playlist's items may be based at least in part on a temporary or permanent condition (e.g., a medical condition) of the user. For example, if the user experiences depression, sleep deprivation, hyperactivity, attention-deficit, and/or other symptoms, the playlist may consider the condition, e.g., by selecting items known or expected to at least partially mitigate the associated symptoms.

The method 600 can further include playing back, via a playback device (e.g., the playback device 110c; FIG. 1C), the items of the media content (process portion 608). For example, the generated playlist is played back via the playback device in the arranged order such that the first item is played first, followed by the intermediate items, and finally the nth item. As explained in additional detail elsewhere herein, the user's emotional state can be continuously monitored while the items are being played back via the playback device. In doing so, the playlist can be updated, e.g., to ensure the user's emotional state is transitioning toward the desired emotional state. For example, if the user's emotional state sways off the pathway between the first and nth items, the playlist can be updated, e.g., to include new items not included on the previous playlist and transition the user's emotional state toward the desired emotional state.

FIG. 7 is a flow diagram of a method 700 for generating a playlist of media content based at least in part on an emotional state of a user. The method 700 is similar to the method 600 (FIG. 6) and includes previously described process portions 602, 604, 606, 608. The method 700 further includes receiving a third signal indicative of an updated emotional state of the user (process portion 710), and based on the third signal, playing back the second item of the playlist. Stated differently, after receiving the updated emotional state via the third signal, the pathway and arranged order of the playlist are maintained such that the second item of the playlist is played back for the user (e.g., after the first item is played back). In such embodiments, the updated emotional state received via the third signal corresponds to a parameter that is less than a predetermined threshold. As previously described with reference to FIG. 2, the parameter can correspond to a determined value, e.g., associated with the brainwave band power densities. For example, in such embodiments the parameter can correspond to a gradient change in the brainwave band power densities relative to a previous signal received from the user. In some embodiments, the parameter can correspond to a difference between an expected emotional state of the user at that time during playback and the updated emotional state of the user as determined using sensor data. The predetermined threshold can correspond to a maximum acceptable value below which the pathway and arranged order of the playlist remain unchanged. Stated differently, the predetermined threshold is a benchmark to determine whether the user's emotional state is transitioning as expected toward the desired emotional state, or alternatively is transitioning in a different direction (e.g., away from the desired emotional state). In some embodiments, if the user's emotional state is transitioning as expected and the parameter associated with the user's emotional state is below the predetermined threshold, the playlist and arranged order can be maintained. However, if the user's emotional state is transitioning in a different direction and the parameter associated with the user's emotional state is above the predetermined threshold, the playlist and/or the arranged order of the playlist may be adjusted. In such embodiments, the predetermined threshold value can be a dynamic value based, e.g., on the user, pathway, current emotion experienced by the user, etc. That is, the predetermined threshold value may not be a single constant value, but rather can vary depending on the user, pathway, current emotion experienced by the user, etc.

FIG. 8 is a flow diagram of a method 800 for generating a playlist of media content based at least in part on an emotional state of a user. The method 800 is similar to the method of method 600 (FIG. 6) and includes previously described process portions 602, 604, 606, 608. The method 800 further includes receiving a third signal indicative of an updated emotional state of the user (process portion 810), and based on the third signal, updating the playlist of media content (process portion 812). Stated differently, after receiving the updated emotional state via the third signal, the pathway and the playlist are updated to include at least one or more different items than that of the original playlist. In such embodiments, the updated emotional state received via the third signal corresponds to a parameter that is more than a predetermined threshold, indicating that the user's emotional state is not transitioning toward the desired emotional state in the expected manner. In response to the received third signal and/or the parameter being above the predetermined threshold, the playlist is updated to include one or more items different than the items on the original playlist. The updated playlist and its order are configured to gradually transition the emotional state of the user back toward the desired emotional state.

Figure 9A:
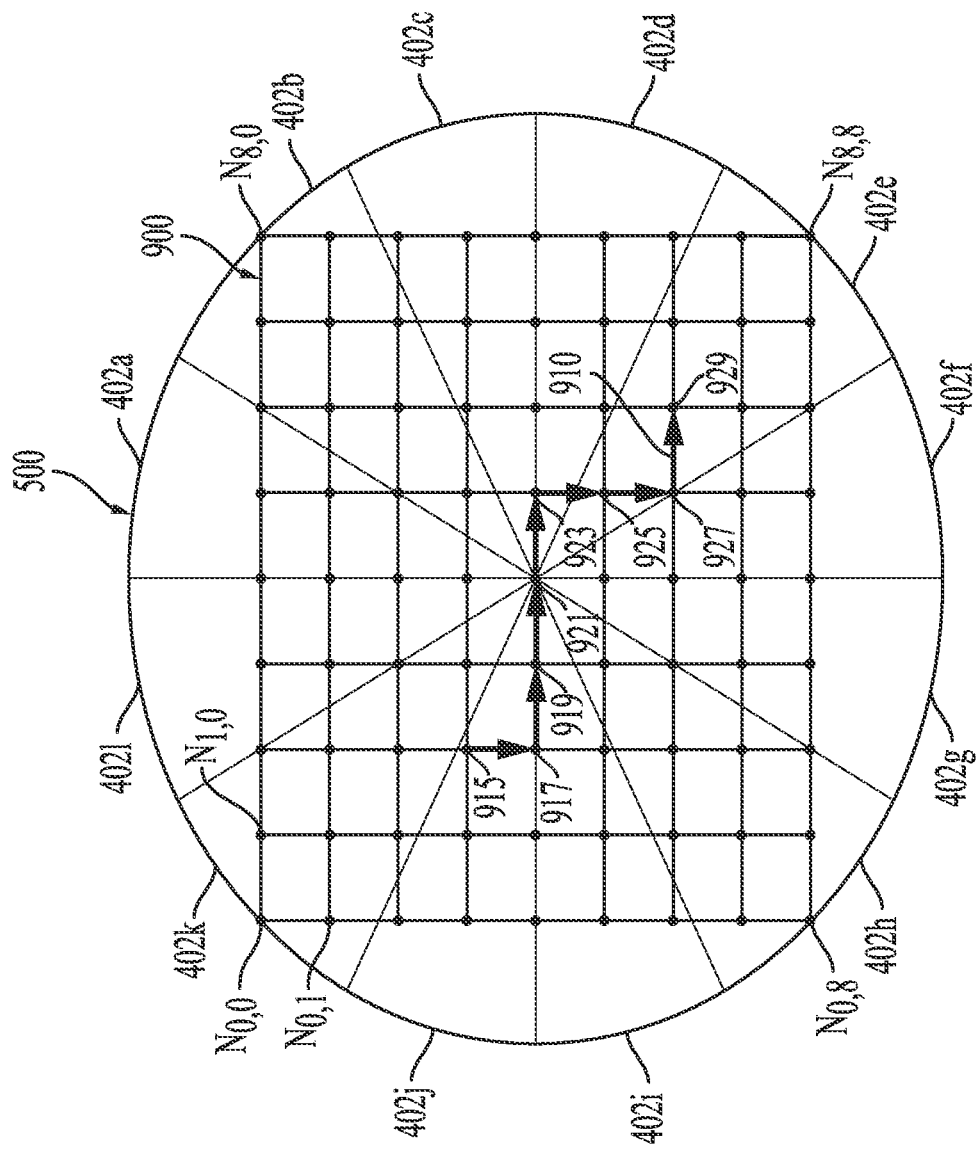
FIGS. 9A-9C are representative illustrations for generating a playlist of media content based at least in part on an emotional state of a user, in accordance with embodiments of the present technology.
Figure 9B:
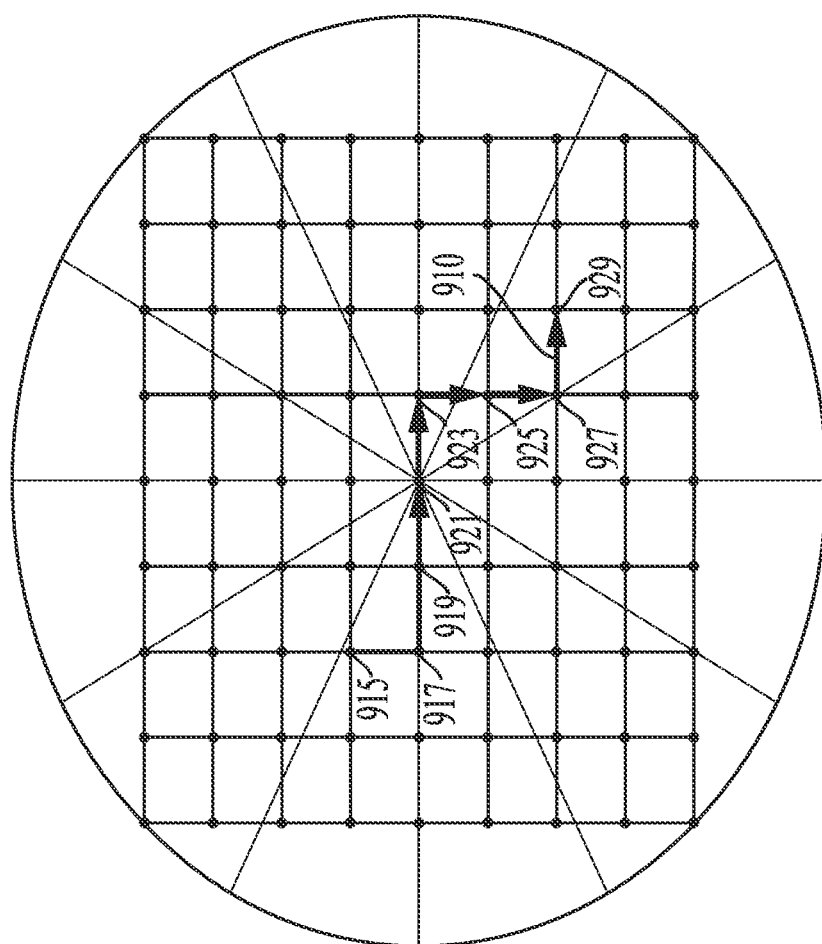
Figure 9C:
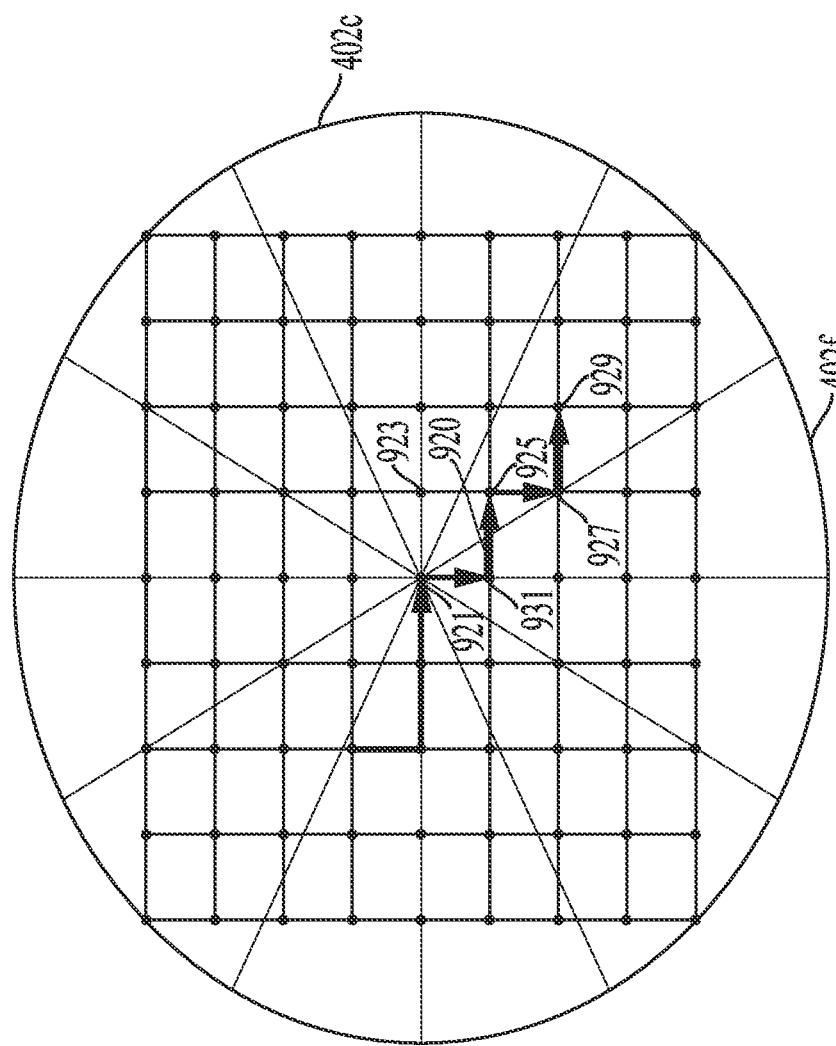

FIGS. 9A-9C are representative illustrations for generating a playlist of media content based at least in part on an emotional state of a user, in accordance with embodiments of the present technology. As shown in FIG. 9A, an array 900 is overlaid onto the plane 500 previously described with reference to FIG. 5. In some embodiments, the array 900 can be overlaid onto the plane 400, previously described with reference to FIG. 4. As previously described and shown in FIG. 9A, the plane 500 includes multiple sections 402a-1 each corresponding to a distinct emotion. The array 900 includes a plurality of nodes (N) each corresponding to an item of media content, as previously described (e.g., with reference to FIGS. 6-8). That is, $N_{0,0}$ corresponds to a first item, $N_{1,0}$ corresponds to a second item different than the first item, and $N_{0,1}$ corresponds to a third item different than the first and second items. In some embodiments, the first item, second item, third item, etc. may each be selected from a list or database of multiple items associated with and/or specific to the respective first node, second node, third node, etc. Selection of the item for the particular node may be determined based on, e.g., a particular item's probability for affecting the user's emotional state (e.g., based on data from that user or other users) and/or whether the particular item has been shown to affect the user's emotional state in a previous occurrence. With each occurrence, the associated system for generating the playlist of the items can iteratively update the list or database of multiple items, e.g., based on the user's history or the history of other users similar to that user. The array 900 is overlaid onto the plane 500 such that each node (N) falls within a particular section 402a-l and thus the emotion associated therewith. As shown in FIG. 9A, the array 900 includes a 9×9 grid-like arrangement of nodes. However, in other embodiments, the array 900 can include more or less columns and/or rows (e.g., 5×5, 6×8, 10×10, 10×15, etc.), and/or have a different arrangement (e.g., a circle-like arrangement).

As shown in FIG. 9A, a pathway 910 (e.g., a first pathway) extends between (i) a first node 915 at $N_{2,3}$ corresponding to the user's current emotional state and (ii) an nth node 929 at $N_{6,6}$ corresponding to the user's desired emotional state, as described with reference to FIGS. 6-8. The pathway 910 also includes a second node 917 at $N_{2,4}$ a third node 919 at $N_{3,4}$ a fourth node 921 at $N_{4,4}$ a fifth node 923 at $N_{5,4}$ a sixth node 925 at $N_{5,5}$ and a seventh node 927 at $N_{5,6}$, each of which corresponds to intermediate nodes between the first and nth nodes 915, 929. As described elsewhere herein, the pathway 910 corresponds to the playlist of media content, or more particularly the arranged order of the playlist, that is to be played back to the user. That is, the pathway's transition from the first node 915 to the second node 917 to the third node 919, etc., corresponds to playing back, via a playback device, the first item associated with the first node 915, the second item associated with the second node 917, the third item associated with the third node 919, etc. In doing so, the generated playlist is configured to transition the user's emotional state from the current emotional state toward and/or to the desired emotional state. For example, in the embodiment illustrated in FIG. 9A, the user's emotional state may transition from "nervous" (i.e., the emotion associated with section 402j which the first, second, and third nodes 915, 917, 919 are in), to neutral (i.e., the fourth node 921), to "pleased" (i.e., the emotion associated with section 402c which the fifth node 923 is in), to "peaceful" (i.e., the emotion associated with section 402e which the sixth, seventh and nth nodes 925, 927, 929 are in). In some embodiments, extension of the pathway 910 in the horizontal or vertical direction between the first and nth nodes 915, 929 is based on minimizing the greater difference in the horizontal or vertical direction between the current node (i.e., the item currently being played back via the playback device) and the nth node 929. For example, if the vertical distance between the current node and the nth node 929 is 3 and the horizontal distance between the current node and the nth node 929 is 2, then the pathway 910 may subsequently extend along the vertical axis for the next transition.

As described elsewhere herein, in some embodiments the user's current emotional state is constantly and/or iteratively monitored or measured (e.g., at predetermined intervals) to ensure the user's current emotional state is transitioning toward the desired emotional state or at least not in a direction opposite the desired emotional state. In such embodiments, as items of the playlist are played back via the playback device to the user in the arranged order defined by the pathway, the user's current emotional state is measured simultaneously. As explained in detail elsewhere herein (e.g., with reference to FIG. 9C), if the user's current emotional state transitions away from the desired emotional state or in an unexpected manner (e.g., not according to pathway), the pathway 910 may in response be updated, thereby also updating the items and/or arranged order of the playlist. Advantageously, this constant and/or iterative monitoring of the user's current emotional state (e.g., in real time) enables embodiments of the present technology to ensure the user's emotional state is transitioning toward the desired emotional state and, if not, make updates to the pathway 910 and corresponding playlist. That is, unlike conventional mood influencing media streaming services which do not monitor the user's current emotional state in real time, embodiments of the present technology are able to track a user's emotional response to a generated playlist associated with the pathway and make real-time adjustments to ensure the user's emotional state is transitioning toward the desired emotional state.

Referring next to FIG. 9B, the playlist has transitioned along the pathway 910 to the third node 919. That is, the playback device has transitioned along the pathway 910, playing back the first item associated with the first node 915 and the second item associated with the second node 917. During such playback, the user's current emotional state is iteratively measured, e.g., to ensure the user's current emotional state is not transitioning away from the desired emotional state or in an unexpected manner. As shown in FIG. 9B, the pathway 910 remains unchanged, indicating that the user's current emotional state thus far is transitioning at least partially toward the desired emotional state. Stated differently, since the pathway 910 remains unchanged, a parameter associated with the user's current emotional state is below a predetermined threshold, as previously described with reference to FIGS. 6-8.

Referring next to FIG. 9C, the pathway 910 (FIGS. 9A and 9B) has been updated to an updated pathway 920. Unlike the pathway 910 that extended to the nth node 929 via the fifth node 923 and section 402c corresponding to a "pleased" emotion, the updated pathway 920 now extends to the nth node 929 via an eight node 931 and section 402f corresponding to a "calm" emotion. The eight node 931 is associated with an item of media content different than that of the fifth node 923. As such, the updated pathway 920 corresponds to an updated playlist different than that of the original playlist associated with the original pathway 910. The reason for updating the pathway may be based, e.g., on the user's current emotional state transitioning away from the desired emotional state or in an unexpected manner. In such embodiments, the updated pathway 920 and associated playlist may be better suited to influence the user's current emotional state toward the desired emotional state, e.g., by playing back items different from those on the original pathway 910 and corresponding playlist.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present technology can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination, and placed into a respective independent example. The other examples can be presented in a similar manner.

Example 1: A method of generating a playlist of media content, comprising: receiving a first signal indicative of a current emotional state of a user; receiving a second signal corresponding to a desired emotional state of the user, the desired emotional state differing from the current emotional state; based on the first and second signals, generating a playlist of media content, wherein generating the playlist comprises: selecting items of media content, including at least (i) a first item of media content having a first parameter corresponding to the current emotional state, (ii) a second item of media content having a second parameter different than the first parameter, and (iii) an nth item of media content having an nth parameter corresponding to the desired emotional state of the user; and arranging the media content in the playlist in a sequential order such that the playlist transitions from the first item toward the nth item; and playing back, via a playback device, at least the first item of the media content.

Example 2: The method of Example 1, further comprising: while playing back the first item, receiving a third signal indicative of an updated emotional state of the user, the third signal corresponding to a third parameter, wherein a difference between the first and third parameters is no greater than a predetermined threshold; and based at least in part on the third signal, playing back the second item of media content.

Example 3: The method of any one of Examples 1 or 2, further comprising: while playing back the first item, receiving a third signal indicative of an updated emotional state of the user, the third signal corresponding to a third parameter, wherein a difference between the first and third parameters is greater than a predetermined threshold; and based at least in part on the third signal, playing back a third item of media content after playing back the first item, the third item being different than the first and second items.

Example 4: The method of Example 3, wherein the first parameter and nth parameter define a first pathway therebetween including the second parameter, the method further comprising: based at least in part on the third signal, updating the first pathway, wherein the first and nth parameters define a second pathway different than the first pathway and including the third parameter.

Example 5: The method of any one of examples Example 1-4, wherein (i) the first parameter corresponds to first coordinates on a plane, (ii) the second parameter corresponds to second coordinates on the plane, and (iii) the nth parameter corresponds to nth coordinates on the plane, the first and nth coordinates defining a pathway therebetween on the plane that includes the second coordinates.

Example 6: The method of Example 5, wherein generating the playlist is based at least in part on an array overlaid onto the plane, the array including nodes each corresponding to the items of media content, wherein the nodes include (i) a first node associated with the first item, (ii) a second node associated with the second item, and (iii) a nth node associated with the nth item.

Example 7: The method of Example 6, wherein the pathway extends from the first node to the nth node, and wherein the order is based at least in part on proximity of the nodes on the pathway.

Example 8: The method of any one of Examples 6 or 7, further comprising: after playing back the first item, playing back, via the playback device, the second item of the media content, the second item being associated with the second node adjacent the first node and on the pathway.

Example 9: The method of any one of Examples 5-8, wherein the plane is tailored to the user, further comprising: determining a neutral emotional state of the user; and based at least in part on the neutral emotional state, adjusting a standard plane to generate the tailored plane.

Example 10: The method of any one of Examples 1-9, wherein receiving the first signal comprises receiving the first signal from a sensor configured to be worn by the user.

Example 11: The method of any one of Examples 1-10, wherein receiving the first signal comprises wirelessly receiving the first signal from a plurality of electroencephalography sensors configured to be worn by the user.

Example 12: A tangible, non-transitory, computer-readable medium having instructions stored thereon that are executable by one or more processors to cause a network microphone device to perform the method of any one of Examples 1 to 11.

Example 13: An audio signal processing system of a playback device, the system comprising a processor; and tangible, non-transitory, computer-readable media storing instructions executable by the processor to cause the audio signal processing system to perform the method of any one of Examples 1 to 11.

Example 14: A network microphone device comprising one or more microphones configured to detect sound, one or more processors, and a tangible, non-transitory computer-readable medium having instructions stored thereon that are executable by the one or more processors to cause the network microphone device to perform the method of any of Examples 1 to 11.

Example 15: A playback device comprising a speaker; a processor; and a tangible, non-transitory computer-readable medium storing instructions executable by the processor to cause the playback device to perform operations of any of Examples 1 to 11.

The invention claimed is:

1. A method, performed by a server computing system having one or more processors and one or more memories, the method comprising:
receiving an indication of a current state of a user;
receiving an indication of a desired state of the user, the desired state differing from the current state;
based on the current state and the desired state, generating a playlist that includes at least a first item of media content having a first parameter corresponding to the current state and a second item of media content having a second parameter corresponding to the desired state;
transmitting the generated playlist to a playback device;
receiving an indication of an updated state of the user;
determining, based at least in part on a pathway between the current state of the user and the desired state, a threshold corresponding to an acceptable difference between an expected state of the user and the updated state of the user;
determining that a difference between the expected state of the user and the updated state exceeds the threshold; and
in response to determining that the difference exceeds the threshold, dynamically updating the generated playlist, based on the received indication of the updated state, to include one or more different items of media content than that of the generated playlist.

2. The method of claim 1, wherein the playback device comprises a wearable device and wherein receiving the indication of the current state comprises receiving the indication of the current state from the playback device.

3. The method of claim 2, wherein receiving the indication of the updated state comprises receiving the indication of the updated state from the playback device.

4. The method of claim 2, wherein the playback device comprises a set of headphones.

5. The method of claim 1, wherein receiving the indication of the desired state comprises receiving the indication of the desired state from a control device.

6. The method of claim 5, wherein the control device is separate from the playback device.

7. The method of claim 1, wherein the media content includes at least one item of generative music.

8. A system comprising:
a server computing system comprising one or more processors and one or more computer-readable media storing instructions that, when executed by the one or more processors, cause the one or more processors to perform operations comprising:
receiving an indication of a desired state of a user, the desired state differing from a current state of the user,
based on the current state and the desired state, generating a playlist that includes at least one item of media content having a first parameter corresponding to the current state and at least one item of media content having a second parameter different from the first parameter and corresponding to the desired state,
transmitting the generated playlist to a playback device for playback of one or more items of media content,
receiving an indication of an updated state of the user,
determining, based at least in part on a pathway between the current state of the user and the desired state, a threshold corresponding to an acceptable difference between an expected state of the user and the updated state of the user,
determining that a difference between the expected state of the user and the updated state exceeds the threshold, and
in response to determining that the difference exceeds the threshold, dynamically updating the playlist, based on the indication of the updated state, to include one or more different items of media content than that of the generated playlist.

9. The system of claim 8, further comprising:
a control device configured to receive, from the user, the indication of the desired state and transmit the indication of the desired state to the server computing system.

10. The system of claim 8, wherein the indication of the current state comprises sensor data received from a wearable sensor.

11. The system of claim 8, the operations further comprising:
transmitting the updated playlist to the playback device for playback of one or more items of media content based on the updated playlist.

12. The system of claim 8, wherein the indication of the desired state is received from a control device and corresponds to a user selection.

13. The system of claim 8, wherein the indication of the desired state is automatically determined by the system based on the current state and a history of use associated with the user.

14. The system of claim 8, wherein the media content includes at least one item of generative music.

15. One or more tangible, non-transitory computer-readable media storing instructions that, when executed by one or more processors of a server, cause the server to perform operations comprising:
receiving an indication of a desired state of a user, the desired state differing from a current state of the user;
based on the desired state, generating a playlist that includes at least one item of media content having a first parameter corresponding to the desired state;
transmitting the generated playlist to a playback device for playback of one or more items of media content;
receiving an indication of an updated state of the user;
determining, based at least in part on a pathway between the current state of the user and the desired state, a threshold corresponding to an acceptable difference between an expected state of the user and the updated state of the user;
determining that a difference between the expected state of the user and the updated state exceeds the threshold; and
in response to determining that the difference exceeds the threshold, dynamically updating the playlist, based on the indication of the updated state, to include one or more different items of media content than that of the generated playlist.

16. The one or more tangible, non-transitory computer-readable media of claim 15, the operations further comprising:
receiving the indication of the updated state from the playback device.

17. The one or more tangible, non-transitory computer-readable media of claim 15, wherein receiving the indication of the desired state comprises receiving the indication of the desired state from a control device.

18. The one or more tangible, non-transitory computer-readable media of claim 15, wherein receiving the indication of the desired state comprises receiving the indication of the desired state from a control device in response to a selection from the user.

19. The one or more tangible, non-transitory computer-readable media of claim 15, wherein the playlist includes at least one item selected based on musical interests of the user and wherein the musical interests of the user are determined based on a profile of the user on a media content application.

20. The one or more tangible, non-transitory computer-readable media of claim 15, wherein the playlist includes at least one item selected based on a permanent condition of the user.

* * * * *